(12) United States Patent
Park et al.

(10) Patent No.: US 9,696,430 B2
(45) Date of Patent: Jul. 4, 2017

(54) METHOD AND APPARATUS FOR LOCATING A TARGET USING AN AUTONOMOUS UNMANNED AERIAL VEHICLE

(71) Applicant: MASSACHUSETTS INSTITUTE OF TECHNOLOGY, Cambridge, MA (US)

(72) Inventors: Michael Jihong Park, Somerville, MA (US); Charles Coldwell, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 79 days.

(21) Appl. No.: 14/468,905

(22) Filed: Aug. 26, 2014

(65) Prior Publication Data

US 2016/0117932 A1    Apr. 28, 2016

Related U.S. Application Data

(60) Provisional application No. 61/870,573, filed on Aug. 27, 2013.

(51) Int. Cl.
*G01S 19/39* (2010.01)
*G05D 1/02* (2006.01)
*G05D 1/00* (2006.01)
*G01C 23/00* (2006.01)

(52) U.S. Cl.
CPC ............ *G01S 19/39* (2013.01); *G05D 1/0094* (2013.01); *G05D 1/0202* (2013.01); *G01C 23/005* (2013.01)

(58) Field of Classification Search
CPC ........ G08G 5/0069; G01S 19/39; G01C 23/00
See application file for complete search history.

(56) References Cited

U.S. PATENT DOCUMENTS

| 8,260,485 | B1* | 9/2012 | Meuth | G06Q 10/063 340/995.21 |
| 2007/0023582 | A1* | 2/2007 | Steele | B64C 39/024 244/190 |
| 2009/0043435 | A1* | 2/2009 | Kane | B61L 25/025 701/19 |
| 2009/0157233 | A1* | 6/2009 | Kokkeby | G01S 3/7864 701/3 |
| 2010/0017046 | A1* | 1/2010 | Cheung | G01S 7/003 701/2 |

OTHER PUBLICATIONS

Timothy Stevens and Timothy H. Chung, Autonomous Search and Counter-Targeting using Levy Search Models, May 6, 2013, 2013 IEEE International Conference on Robotics and Automation (ICRA).*

(Continued)

*Primary Examiner* — Jelani Smith
*Assistant Examiner* — Jordan S Fei
(74) *Attorney, Agent, or Firm* — Daly, Crowley, Mofford & Durkee, LLP

(57) ABSTRACT

Described herein is an unmanned aerial vehicle (UAV) system that incorporates sensor data to statistically minimize the time to autonomously locate a target on the ground. The system uses a two-stage approach to finding the RF target: 1) randomized flight, such as Lévy fight, to search the ground space and, 2) a geo-localization process, such as a simplex minimization process, to home in on the target.

17 Claims, 10 Drawing Sheets

(56) References Cited

OTHER PUBLICATIONS

Andrew Ke-Ping Sun, Cooperative UAV Search and Intercept, 2009, A thesis submitted in conformity with the requirements for the degree of Master of Applied Science Graduate Department of Aerospace Science and Engineering University of Toronto.*
Nelder, et al.; "A Simplex Method for Function Minimization;" The Computer Journal; vol. 7; No. 4: 1965; pp. 308-313.
Schwager et al.; "Optimal Coverage for Multiple Hovering Robots with Downward Facing Cameras;" IEEE International Conference on Robotics and Automation; Kobe International Conference Center; May 12-17, 2009; pp. 3515-3522.
Park, et al.; "Sensor Integrated Navigation for a Target Finding UAV;" http://link.springer.com/chapter/10.1007%2F978-3-662-43645-5_10 downloaded Sep. 10, 2014; 16 pages.
Viswanathan, et al.; "Optimizing the Success of Random Searches;" Nature; vol. 401; Oct. 28, 1999; pp. 911-914.
Witze; "Sharks Have Math Skills;" http://news.discovery.com/animals/sharks/sharks-math-hunt.htm; downloaded on Sep. 12, 2014; 6 pages.

* cited by examiner

METHOD AND APPARATUS FOR LOCATING A TARGET USING AN AUTONOMOUS UNMANNED AERIAL VEHICLE

CROSS REFERENCE TO RELATED APPLICATION

This application claims the benefit under 35 U.S.C. §119 (e) of U.S. Provisional Application No. 61/870,573 filed Aug. 27, 2013, which application is incorporated herein by reference in its entirety.

GOVERNMENT RIGHTS

This invention was made with government support under Contract No. FA8721-05-C-0002 awarded by the US Air Force. The government has certain rights in this invention.

FIELD

The subject matter described herein relates to unmanned aerial vehicles (UAVs) and more particularly to a UAV that utilizes sensor data to statistically reduce, and ideally minimize, an amount of time required for the UAV to autonomously locate a target.

BACKGROUND

As is known in the art, sensor integrated path planning has been a central area of research for autonomous robotic systems for many decades. In recent years, goal-oriented path planning with obstacle avoidance has gained widespread exposure (see e.g., the 2004 and 2007 DARPA Unmanned Ground Vehicle (UGV) challenges). More recently, due at least in part to improvements in power sources (e.g., lithium polymer batteries) and less expensive motors (e.g., brushless motors), task planning for small multirotor platforms has become an active area of autonomous systems research.

One common method for aerial Intelligence, Search, and Reconnaissance (ISR) missions over a designated area of interest is to use pre-programmed flight paths that cover a specified area. "Lawnmower" path or polygonal flight paths are common examples. Unmanned aerial vehicle (UAV) flight control and sensor data acquisition are typically decoupled in intelligence-related missions. In the archetypal case, a UAV flies pre-programmed Global Positioning Satellite (GPS) waypoints while an onboard sensor streams data to a ground control station observed by a human or post-processed for analysis.

SUMMARY

It is appreciated herein that there is a need to rapidly and autonomously locate a target in an unknown location within a designated area of interest, specifically in situations where a sensor's range to the target is smaller (and in some cases significantly smaller) than the designated area of interest. In particular, an unmanned aerial vehicle (UAV) that incorporates onboard sensors to complete a pre-determined mission (e.g. searching for a target at an unknown location) more efficiently improves upon conventional pre-programmed search fight path techniques that are decoupled from potentially useful sensor data.

In accordance with the concepts sought to be protected herein, a UAV for locating a target within a designated area of interest comprises: a position determination unit to generate location data concerning the UAV's position; a sensor to obtain sensor data associated with the target; a flight path determination unit operatively coupled to receive the location data from the position determination unit and the sensor data from the sensor, and in response to the location data and the sensor data the flight path determination unit selects a flight path directed by one of: a randomized flight process to search the designated area of interest and a geo-localization flight process to home in on the target. The UAV further includes a flight controller operatively coupled to the flight path determination unit to fly the UAV along the selected flight path.

With this particular arrangement, a UAV for finding (i.e. physically locating) a target located in an unknown place within a region of known bounds in a minimum time possible is provided. By combining onboard location data and sensor data, the UAV autonomously directs itself along a flight path that statistically reduces (and ideally minimizes) an overall flight time required to locate a target.

In particular embodiments, the randomized flight process comprises Lévy flight and/or the geo-localization flight process comprises a simplex minimization process.

In some embodiments, the flight path determination unit is located remote from the UAV, such as within in a ground station. In various embodiments, the sensor data includes values corresponding to confidence levels which provide at least a general indication of the proximity of the UAV to the target. In some embodiments, the target comprises a radio frequency (RF) transmitter and the sensor comprises a received signal strength indicator (RSSI) receiver. In various embodiments, the position determination unit comprises a Global Positioning System (GPS) receiver. In some embodiments, the flight path determination unit transitions from the randomized flight process to the geo-localization flight process when at least three different locations are identified having associated confidence level values exceeding a predetermined threshold value and/or only if the at least three different locations are not collinear. In various embodiments, the flight path determination unit bounds the selected flight path to within the designated area of interest.

According to another aspect of the concepts sought to be protected herein, a method for navigating a UAV to locate a target within a designated area of interest comprises: directing the UAV over the designated area of interest using a randomized flight process; during the randomized flight process, receiving location data (e.g., GPS coordinates) concerning the UAV's position and sensor data associated with the target; processing the location data and the sensor data to identify a plurality of locations suitable to initialize a geo-localization flight process; transitioning from the randomized flight process to the geo-localization flight process; directing the UAV over the designated area of interest using the geo-localization flight process initialized using the plurality of locations; and estimating the target location using a final UAV location.

In a particular embodiment, the randomized flight process comprises choosing a random step sizes, choosing a random directions, and directing the UAV to random locations defined by the random step sizes and the random directions. The random step sizes may be chosen using a Cauchian or a Gaussian distribution. In some embodiments, receiving sensor data associated with the target comprises receiving received signal strength indication (RSSI) data associated with a radio frequency (RF) transmitter. In various embodiments, processing the location data and the sensor data to identify a plurality of locations suitable to initialize a geo-localization flight process comprises identifying at least three locations having associated confidence level values which exceed a pre-determined threshold value and/or finding at least three locations that are not collinear. In a particular embodiment, the geo-localization flight process comprises a simplex minimization process.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. As used herein, the term "confidence level" refers to a measure or assessment of the reliability that a UAV is within a certain distance from a target and/or is moving closer to the target. As used herein, the term "UAV platform" used herein is synonymous with "UAV," which may be a customized or specially manufactured UAV or a commercially available UAV that can be readily modified by the addition of hardware and/or software components.

Figure 1:
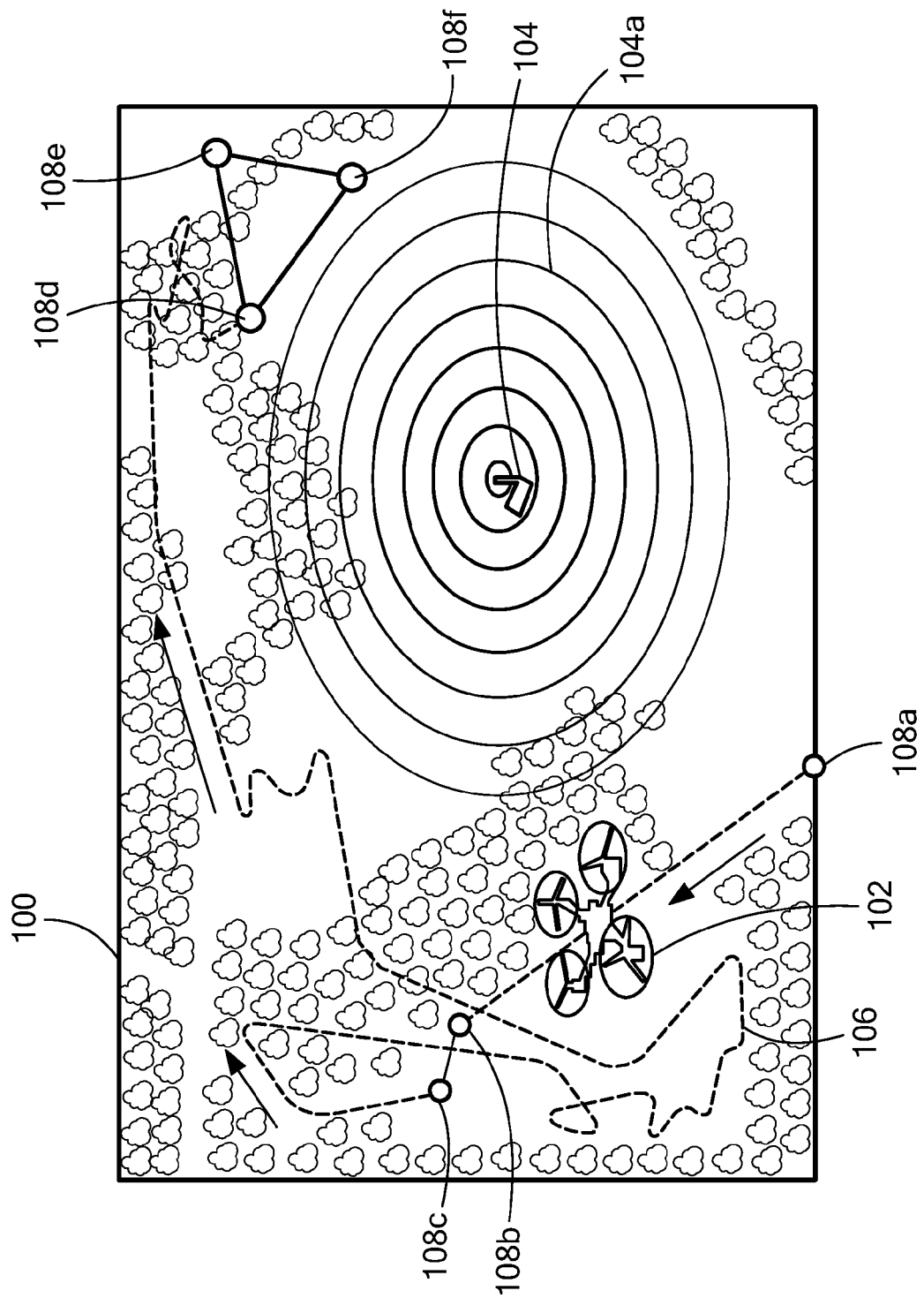
FIGS. 1 and 1A are perspective-view diagrams illustrating a technique for navigating an unmanned aerial vehicle (UAV) to locate a target within a within a designated area of interest.
Figure 1A:
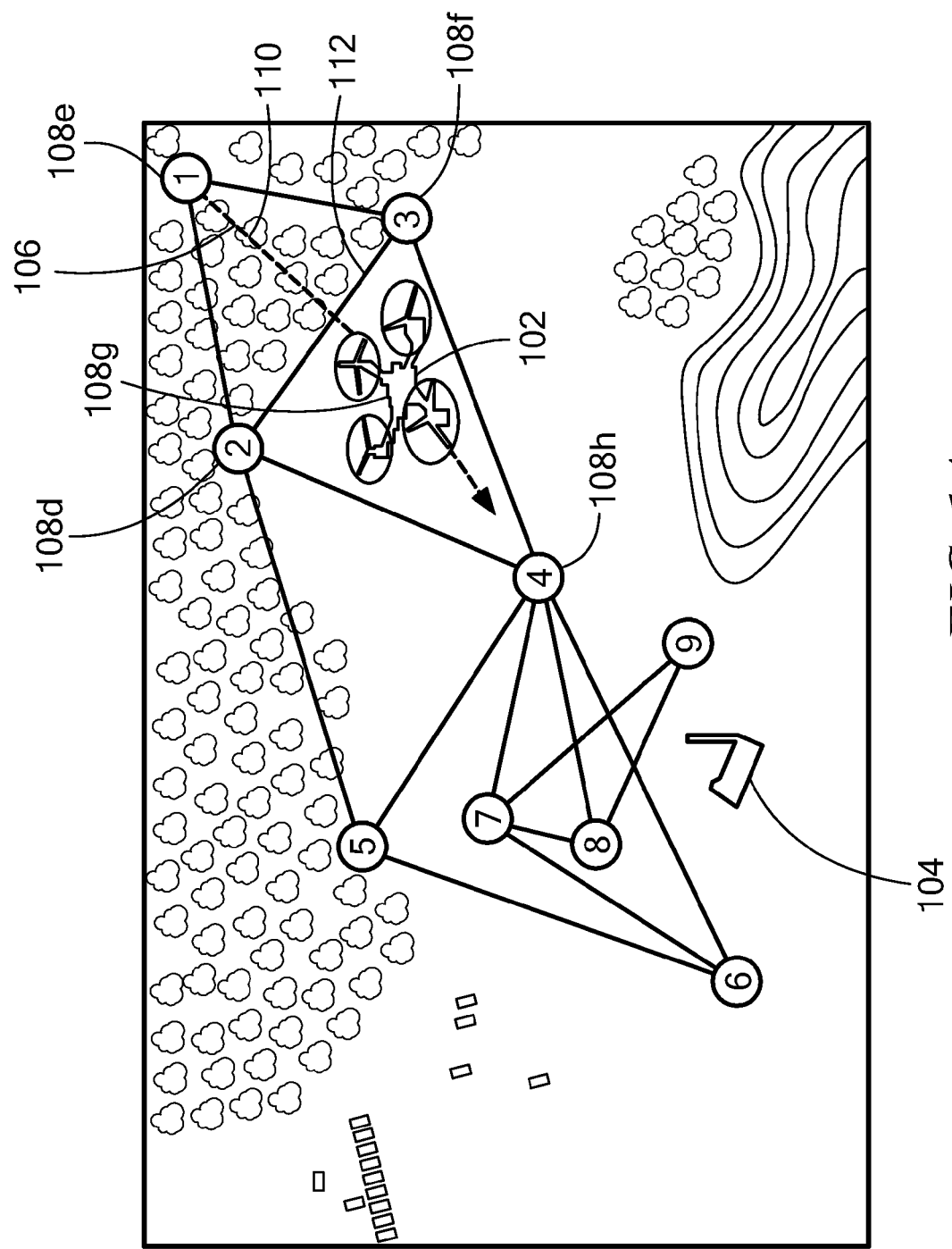

Referring to FIGS. 1 and 1A, in which like elements are shown having like reference designations, a UAV 102 uses onboard sensor data to locate a target 104 within a designated area of interest (also referred to herein as a "search area") 100. The UAV 102 may be based upon any suitable UAV platform, including but not limited to a single rotor, a multirotor (e.g., a quadrotor or octorotor), or a fixed wing platform. Illustrative UAV platforms for use with the UAV 102 are described in detail below in conjunction with FIGS. 2 and 4. The UAV 102 generally has no prior knowledge as to the location of target 104 within the search area 100. In some embodiments, the UAV 102 operates autonomously, meaning without input from an operator or other external entity. In a particular embodiment, described below in conjunction with FIGS. 4 and 5, the UAV delegates certain processing to a remote processor (e.g., a ground station).

Figure 3:
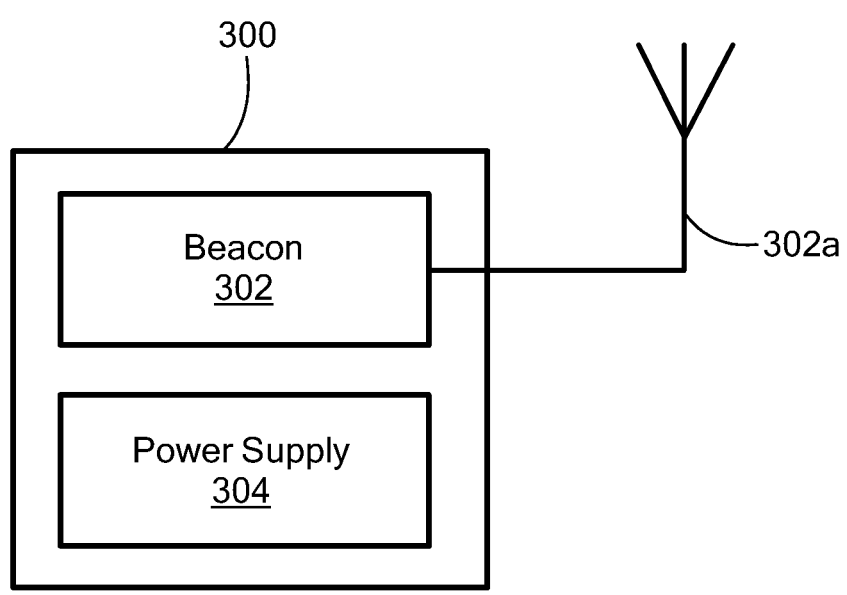
FIG. 3 is a block diagram illustrating a target locatable by the UAV of FIG. 2.

In general, the target 104 can be any type of physical object known to the UAV 102. In embodiments, the target 104 includes an emitter (or "beacon") to radiate electromagnetic waves detectable by the UAV's onboard sensor. Non-limiting examples of beacons which may be used include an RF transmitter to transmit RF signals, a light source to emit light (e.g., infrared radiation, visible light, laser beams, etc.), and a sound generator to generate and radiate audio waves. In other embodiments, the UAV 102 uses a camera and image processing techniques to detect the target 104, in which case the target need not include a beacon. For example, the target 104 may have a distinctive shape or surface known to the UAV, enabling the UAV to detect the target within the search area 100. As a more specific example, if the target is known to be a red car, the UAV can capture images using a camera and use image processing techniques known in the art to identify a red car and to estimate the proximity of the car. An illustrative RF transmitter target is shown in FIG. 3 and described below in conjunction therewith.

The UAV sensor is capable of detecting (or "sensing") the target 104 within a certain range 104a (referred to herein as the "sensor range"). The particular sensor range in any application may be affected by a number of factors, including but not limited to the power of the target's beacon, the sensitivity/accuracy of the onboard sensor, and/or the physical size of the target (e.g., in the case when the sensor comprises a camera). In general, the sensor range 104 is smaller (and in some applications significantly smaller) than the overall search space 100, hence the need to move the UAV throughout the search space to locate it.

In operation, the UAV 102 moves within the search area 100 along a dynamically selected flight path 106 to locate the target 104. The flight path 106 can include a plurality of waypoints 108 (for clarity and simplicity of explanation, only four of the waypoints 108a-108h are labeled in the figures). A segment of the flight path between two waypoints is referred to as a "step" and the distance between two waypoints is referred to as a "step size" or "step radius." In some embodiments, the UAV 102 flies at a generally fixed altitude (e.g., 20 or 25 meters above the ground) while searching for the target 104. Accordingly, the flight path 106 may lie within a plane (referred to herein as the "flight plane") and well-known two-dimensional search techniques can be employed.

The UAV 102 (or a ground station) selects the flight path 106 using a two-part search strategy. First, the UAV 102 uses randomized flight (e.g., Lévy flight) to move within proximity of the target 104. Second, the UAV 102 uses a geo-localization process (e.g., a simplex minimization process) to home in on the target 104. In the example shown in FIGS. 1 and 1A, the waypoints 108a-108f are selected using randomized flight, whereas the waypoints 108g and 108h are selected using a geo-localization process. In other words, the UAV 102 starts its search at location 108a and uses randomized flight to fly to locations 108b, 108c, etc. until reaching the locations 108d-108f. During the randomized flight portion, each next waypoint is selected by choosing a random step size and a random direction to determine the next waypoint Those skilled in the art will appreciate that, statistically, the optimal flight path strategy is a generalized random walk called Lévy flight. In Lévy flight, the directions of flight are random and isotropic (as in a usual random walk) but the step sizes are chosen from a probability distribution that is typically $$\frac{1}{r} \text{ (Cauchian)}$$

-continued or $$\frac{1}{r^2} \text{ (Gaussian)}$$

where r is the radius step size (as opposed to a usual random walk where all of the step sizes are the same). It should be noted that using an inverse power distribution yields step sizes that more often small and clustered and only occasionally far and distant.

Accordingly, the UAV 102 may choose the step size to the next waypoint (e.g., 108b) using the Cauchian, Gaussian, or any other any suitable random distribution. Likewise, the UAV 102 uses any suitable random distribution (e.g., the uniform distribution) to choose the direction of the next waypoint.

Since Lévy flights and other random walks are theoretically unbounded, a search limit may be imposed. In FIG. 1, for example, the search may be limited to the search area 100. The target is known/assumed to be within the search area and, thus, during the course of its search flight, the UAV 102 can ignore and choose not fly to locations outside of the search area. For example, if the UAV 102 chooses a random waypoint outside the search area, it may elect to disregard that choice and choose another waypoint, repeating the process until a waypoint within the search area is chosen. The search area can have any suitable shape, such as a circular shape, an elliptical shape, a polygon shape, etc. In a particular embodiment, the search area is defined by a radius about a designated origin point on the ground. Although the search area can be any size, it is contemplated herein that a search area may be limited to a few square miles. Prior to a search operation, the defined search area 100 can be stored within the UAV 102 and/or within a ground station.

The UAV 102 flies to the next waypoint 108b and uses a sensor (e.g., an onboard sensor) to attempt to detect the target 104. Using sensor data, the UAV 102 calculates a confidence level value (i.e., a scalar value), which is related to, for example, an estimate of the relative distance between the UAV 102 and the target 104. If the UAV 102 cannot detect the target beacon (e.g., the UAV 102 is outside the range 104a), the confidence level can be set to a nominal value (e.g., zero). In various embodiments, the UAV 102 collects Received Signal Strength Indication (RSSI) data in response to a target emitting an RF signal. As the UAV flies closer to the target 104, the detected RSSI signal level increases.

The UAV 102 repeats the randomized flight stepping process until certain criteria are met and, subsequently, switches to a geo-localization process. In various embodiments, the geo-localization process corresponds to a simplex minimization process.

Figure 6:
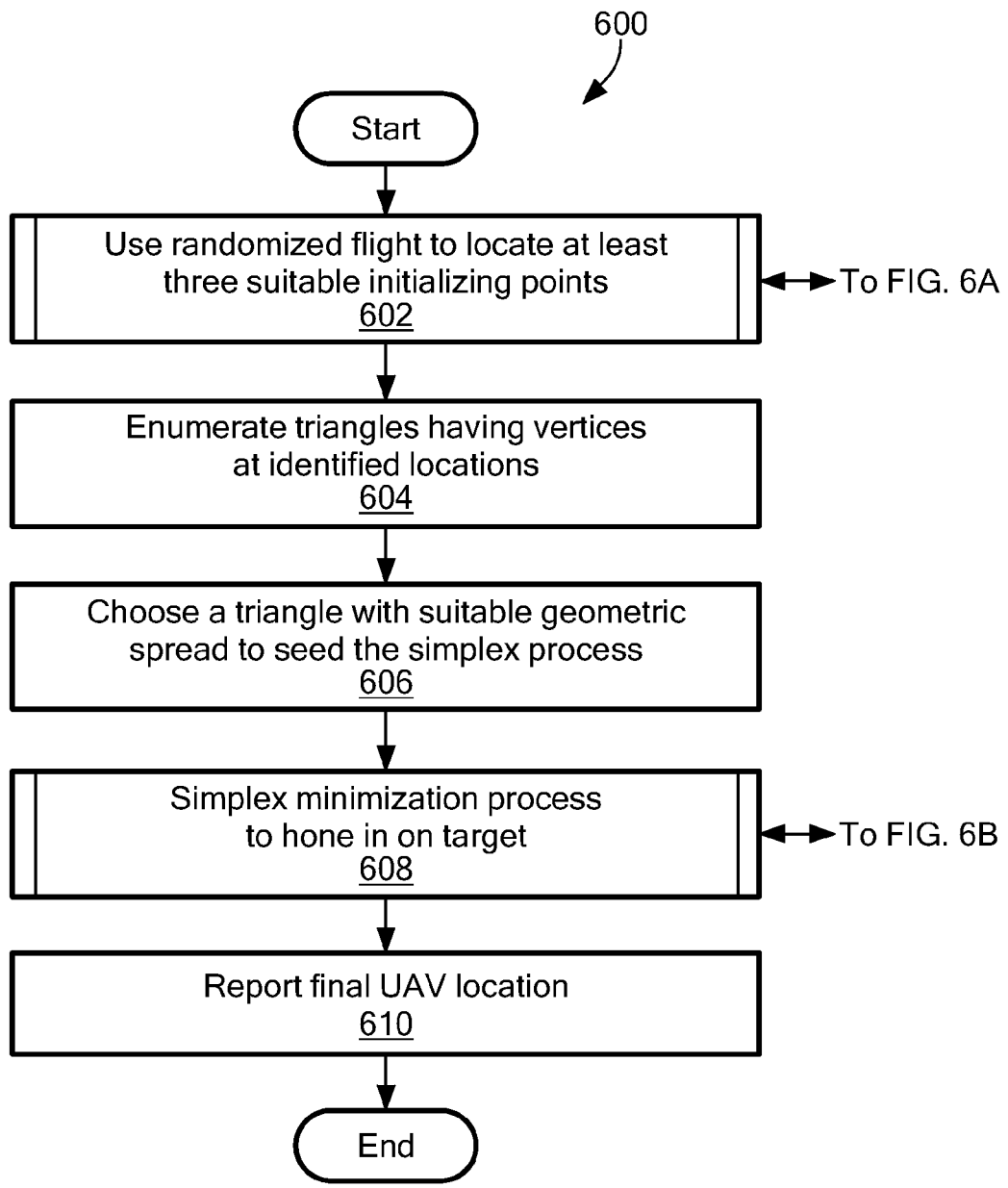
FIGS. 6, 6A, and 6B are flowcharts illustrating methods and processes for use with the systems of FIGS. 2, 4, and 5.
Figure 6A:
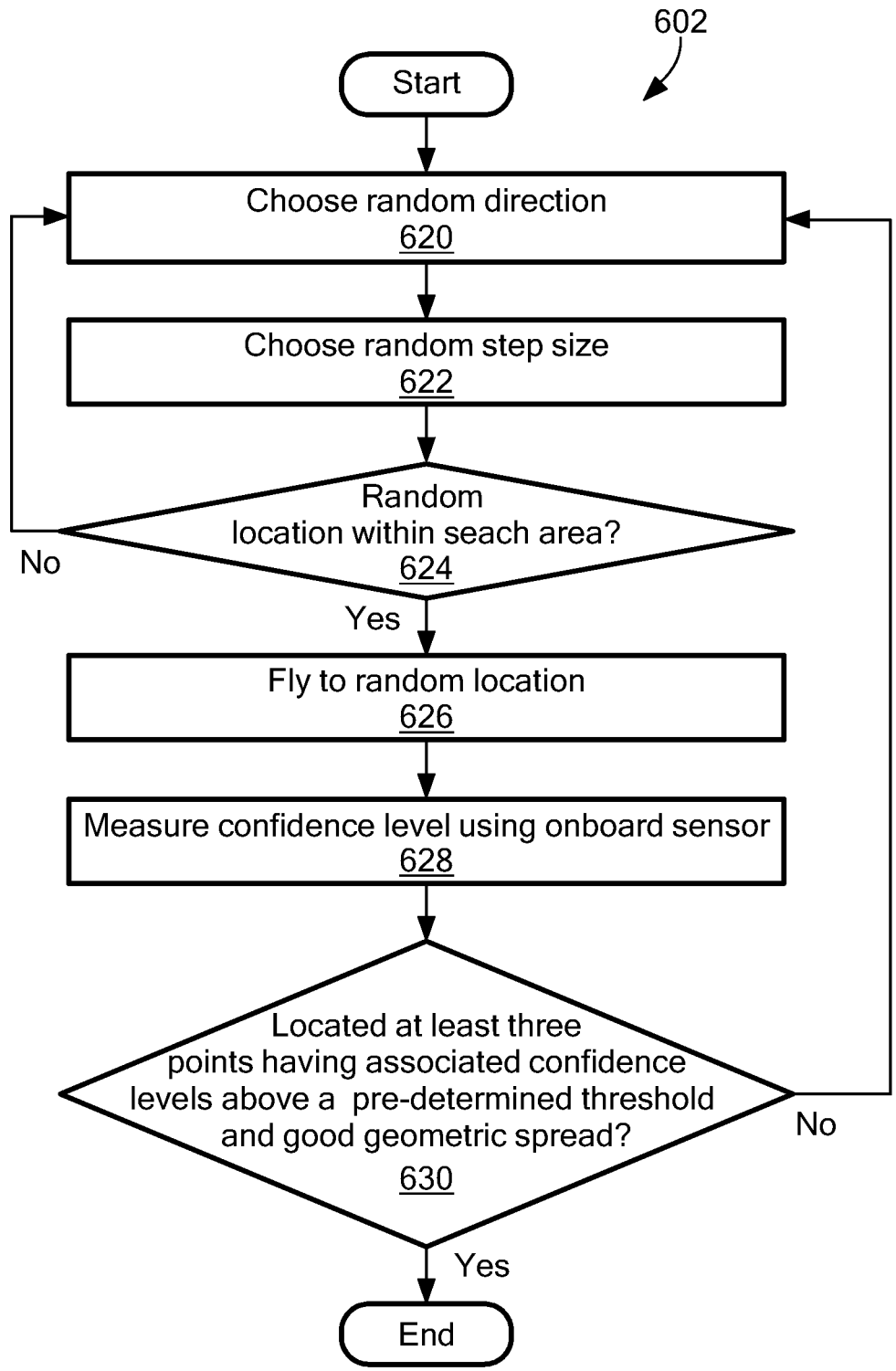
Figure 6B:
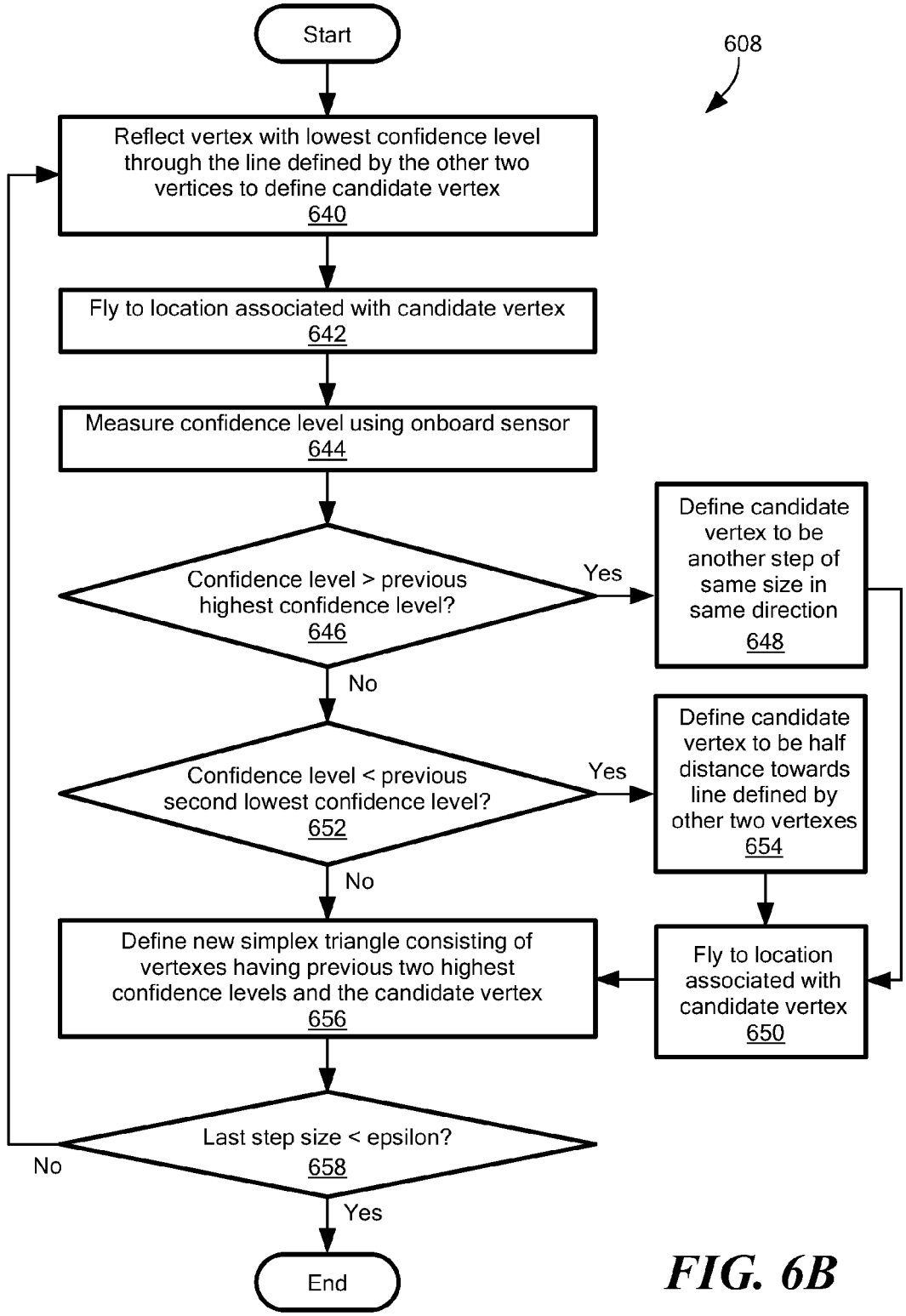

It will be understood that simplex minimization is an optimization technique which can be used to statistically reduce (and ideally minimize) the time to locate a point within a plane. Although a more detailed description of simplex minimization is shown in FIG. 6B and discussed below in conjunction therewith, a brief overview is given herein. The applied method essentially takes three points in a plane, each of which has an associated scalar value (which may, for example, correspond to a confidence level), and uses the associated values to select a fourth point which is expected to have a higher associated value (e.g., have a stronger RF signal). At the fourth point, an associated scalar value is obtained and, using that value, a decision is made to move further in the same direction or to backtrack. The method begins by finding three points to form an initial (or "seed") simplex triangle and is iterated until certain criteria are satisfied (e.g., the most recent step size is below a minimal threshold value or "epsilon").

Accordingly, in embodiments that utilize a simplex minimization process, the UAV 102 may switch form randomized flight to a geo-localization process when at least three points having a sufficient confidence level are found (e.g., confidence levels above a pre-determined threshold) so as to form an adequate initial simplex triangle. In general, the threshold value may be selected, at least in part, based upon the characteristics (e.g., one or more electrical and/or mechanical characteristics) of the UAV 102 and associated sensors. In one embodiment, the threshold value is selected in an ad hoc manner. The threshold value may also be determined empirically. In one embodiment, the threshold value is selected such that the initial simplex triangle is within an area that is a certain fraction of the overall search area. For example, if the search is limited to a 90-meter radius, the threshold may be selected to such that the transition from randomized flight to a geo-localization process occurs when the UAV is within 10-20 meters of the target. In some embodiments, the points are selected so as to not be collinear and to have geometric spread exceeding a pre-determined threshold.

Any suitable measure of geometric spread can be used. In a certain embodiment, a triangle's geometric spread is defined as the difference between the sum of the lengths of the two shorter sides and the length of the longest side, normalized by the sum of the lengths of all three sides.

Referring specifically to FIG. 1A and the example shown therein, the UAV 102 transitions to simplex minimization when the three waypoints 108d, 108e, 108f are located and used to form the initial simplex triangle. The subsequent waypoints 108g, 108h are selected by iteratively applying a simplex minimization process, starting with the initial triangle. With each iteration, a new simplex triangle may be defined and, in general, each iteration brings the UAV closer to the target. After a series of simplex minimization sequences has completed, the UAV 102 autonomously lands near the target 104 and reports its geographic location, which can be an accurate estimate of the target location. In embodiments, the UAV 102 transmits its geographic location to a remote system (e.g., a ground station).

Figure 2:
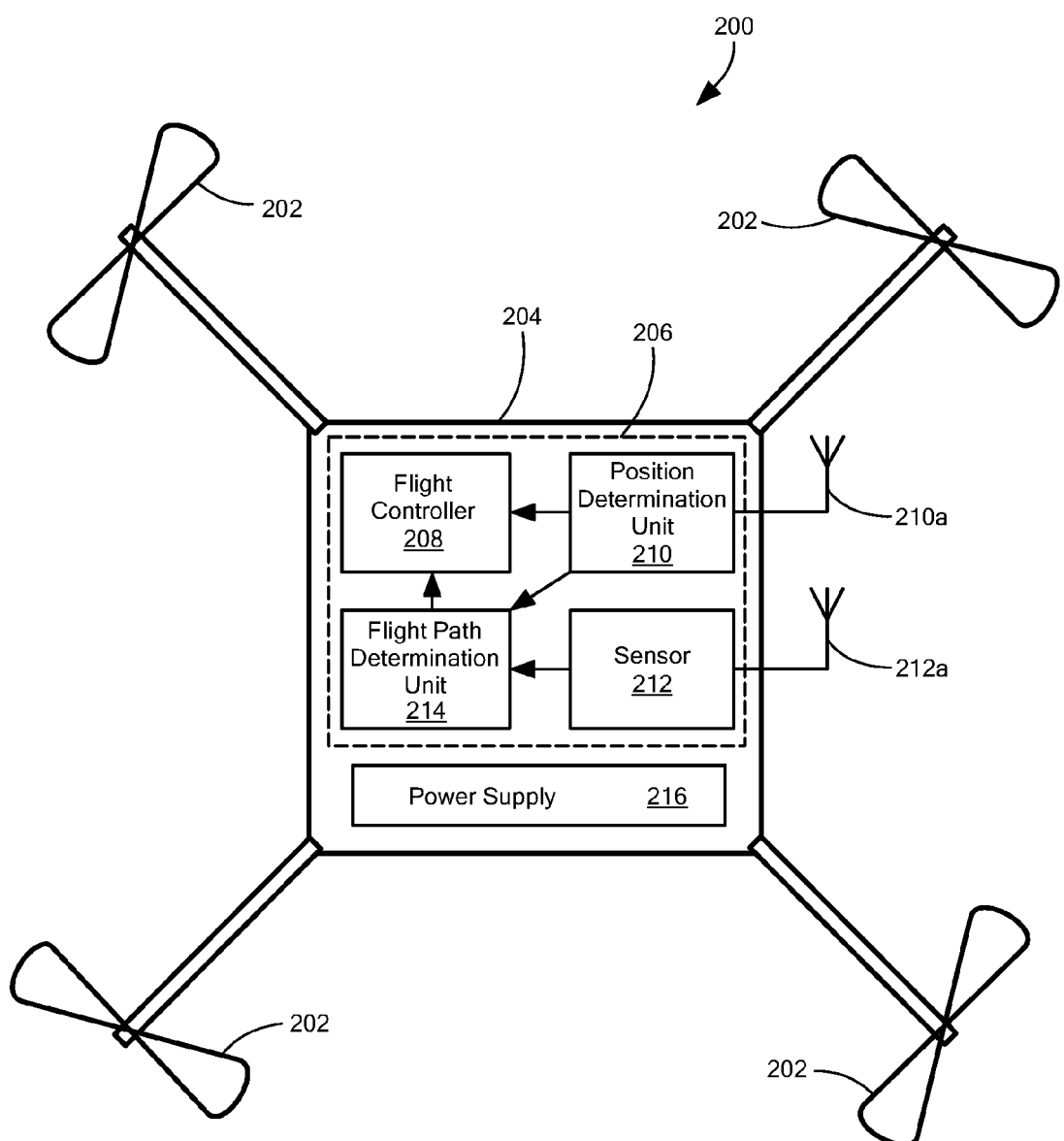
FIG. 2 is a block diagram illustrating a UAV platform having an onboard sensor to locate a target.

Referring to FIG. 2, an illustrative UAV platform 200 may be the same as or similar to UAV 102 of FIG. 1. The UAV platform 200 includes a plurality of rotors 202 and various avionics 206 supported by a support structure (or "body") 204. In this example, the UAV platform 200 includes four rotors 202 and is thus referred to as a quadcopter. The illustrative avionics 206, which may include any suitable combination of hardware and/or software components, includes a flight controller 208, a position determination unit 210, a sensor 212, and a flight path determination unit 214. In some embodiments, a rotor 202 comprises a brushless electric motor and a plurality of blades coupled thereto. The UAV platform 200 may further include a power supply 216 (e.g., a battery, solar cell, etc.) to power the avionics 206 and/or the rotors 202.

The flight controller 208 executes a flight plan, which can be pre-determined or dynamic. In the embodiment shown, the flight controller receives flight path information from the flight path determination unit 214 and controls the rotors 202 to fly the UAV along a dynamically selected flight path. The flight path information may include one or more waypoints expressed in absolute terms (e.g., as GPS coordinates) or in relative terms (e.g., as step sizes and step directions). The flight controller 208 may also receive automatic and/or manual flight instructions from other processing units within the UAV and/or from a remote operator. In some embodiments, the flight controller 208 also uses position information from the position determination unit 210 to navigate to an instructed location.

The sensor 212 includes any suitable combination of software and/or hardware to detect a target and to generate corresponding sensor data. The sensor data may comprise scalar values, such as confidence levels. As discussed above, various types of sensors 212 are contemplated. In some embodiments, a sensor 212 comprises an RSSI receiver to indicate the proximity to an RF transmitter. In some embodiments, a "heat map" technique may be used (e.g. in combination with RSSI data). In other embodiments, the sensor uses a Doppler technique to indicate the UAV is moving towards the target or away from the target (e.g., as the UAV moves toward a target, frequency is redshifted and as the UAV moves away from a target, frequency is blueshifted; the point at which this transition occurs allows identification of one coordinate). In still other embodiments, a LiDAR or camera could be input as the sensor. In general, any sensor that can generate a scalar value indicating, within a certain confidence, that a target is nearby and/or that the UAV is moving closer to (or further from) the target may be suitable. In the case of an RF transmitter target, the sensor 212 may include an RF receiver configured to use to the same frequency and/or modulation scheme as the RF transmitter.

The flight path determination unit 214 uses position information received from the position determination unit 210a and sensor data received from the sensor 212 to generate flight path information, which is provided to the flight controller 208. In some embodiments, the flight path determination unit 214 also uses information about the search area boundaries to limit the search to a designated area of interest. For example, search area boundaries may be pre-programmed into the flight determination unit 214 or stored upon a memory accessible by the unit 214.

In general, the flight path determination unit 214 uses an autonomous control scheme whereby it uses the UAV's current position, sensor data, and search area boundaries to continuously search for the target. In one embodiment, the UAV performs all necessary computations on the UAV platform. In an alternate embodiment, which is described more fully below in conjunction with FIG. 4, a remote processor performs at least a portion of the flight path determination process. An illustrative technique that can be used within the flight path determination unit 214 is shown in FIGS. 6, 6A, and 6B and described below in conjunction therewith.

In some embodiments, the UAV platform 200 is implemented using commercially available equipment and software. For example, in a particular embodiment, the UAV platform 200 is based on the ArduCopter multicopter UAV platform and, more specifically, may be a modified version of a "ready-to-fly" ArduCopter distributed by 3D Robotics of Berkley, Calif., USA. In particular, for the UAV platform, a 3D Robotics Arducopter with an integrated, onboard Ardupilot CPU can be used. It will be understood that the Arducopter platform includes open source software and configurable hardware system, making it relatively easy to adapt and extend to achieve the functionality described herein. Ready-to-fly Arducopters may include flight dynamics control, automatic takeoff and landing capability, GPS-guided flight capability, altimeter sensors, and a basic communication structure. Thus, the flight controller 208 and position determination unit 210 can be provided by an unmodified ready-to-fly Arducopter. A ready-to-fly Arducopter may further include a serial data link to a PC (e.g., a 900 MHz XBee serial data link, a USB XBee PC serial data link, etc.) and/or a manual override signal input (e.g., operating at 2.4 GHz).

In some embodiments, a commercially available UAV platform is modified to include an onboard sensor 212. For example, to locate an RF transmitter, an RSSI receiver may be added. In the case of an Arducopter, the RSSI receiver output may be coupled to a serial input port of the central Ardupilot controller, allowing the Ardupilot CPU to receive and process signal strength data from the RSSI receiver. In embodiments, the RSSI receiver generates a voltage level signal (e.g., between 0V and +5V) and the serial input port is an analog input. In embodiments, the RSSI receiver is a LINX RSSI/RF receiver distributed by Linx Technologies of Merlin, Oreg., USA. A LINX receiver is capable of estimating physical proximity to an RF transmitter located on the ground. The RSSI output voltage amplitude of a LINX receiver generally decreases as $$\frac{1}{r^2},$$

where r is an estimate or me distance between the transmitter and receiver.

It should be understood that other hardware peripheral devices could be readily integrated into the UAV platform 200, including various communication and control capabilities. For example, a Spektrum DX8 900 MHz manual radio controller can be added for manual flight takeoffs and manual override to the Ardupilot controller for testing purposes.

In various embodiments, a ready-to-fly Arducopter is modified to include software and/or hardware to implement the flight path determination unit 214. For example, the flight path determination unit 214 may correspond to computer instructions stored in a memory and executable by a general-purpose processor (e.g., an Ardupilot CPU). In a particular embodiment, the computer instructions correspond to one or more of the steps shown in FIGS. 6, 6A, and 6B and described below in conjunction therewith.

Referring to FIG. 3, an illustrative target 300, which may be the same as or similar to target 104 of FIG. 1, is locatable by a UAV within a search area. The target 300 may include a beacon 302, a power supply 304, and other features that are not shown. In various embodiments, the beacon 302 comprises a RF emitter to transmit RF signals at a known frequency into free space via an antenna 302a. The RF emitter may be configured to use to the same frequency and/or modulation scheme as an RF receiver upon a UAV (e.g., UAV 102 of FIG. 1). In some embodiments, a target 300 does not include a beacon, but can be located by a UAV sensor using other techniques described above, including but not limited to thermal processing and image processing.

Figure 4:
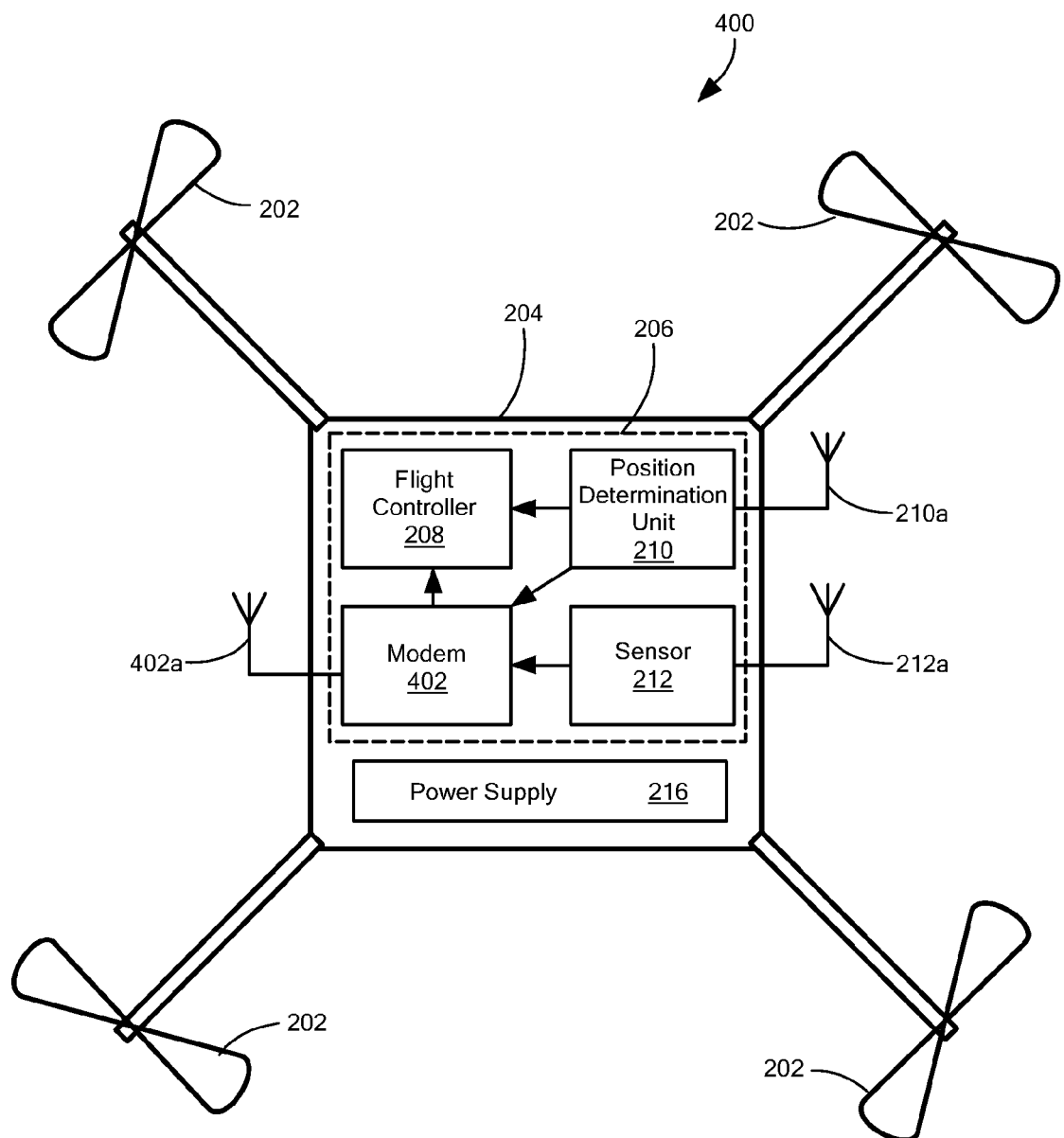
FIG. 4 is a block diagram illustrating an alternate embodiment of a UAV platform.

FIG. 4 shows an illustrative UAV platform 400 which is similar to the UAV platform 200 of FIG. 2, but wherein at least a portion of the processing is performed remote from the UAV (i.e., not all processing is done onboard the UAV). Within FIGS. 2 and 4, like elements are shown having like reference designations and, for simplicity of explanation, FIG. 4 is described herein only in terms of the differences there between. In the example shown, the UAV 400 relies on a remote processor to determine flight path information.

Accordingly, the UAV 400 does not include a flight path determination unit, but does include a modem 402 to communicate with a remote processor. The modem 402 receives position information from a position determination unit 210, sensor data from a sensor 212, and is configured to transmit this information along with any other useful telemetry data to a remote processor via an RF antenna 402a. The modem 402 may include any suitable hardware and/or software to transmit the telemetry data to the remote processor and to receive flight path information (e.g., waypoints) in response. For example, the modem 402 may include an RF transceiver. In a particular embodiment, the modem 402 comprises a 900 MHz XBee modem module.

Figure 5:
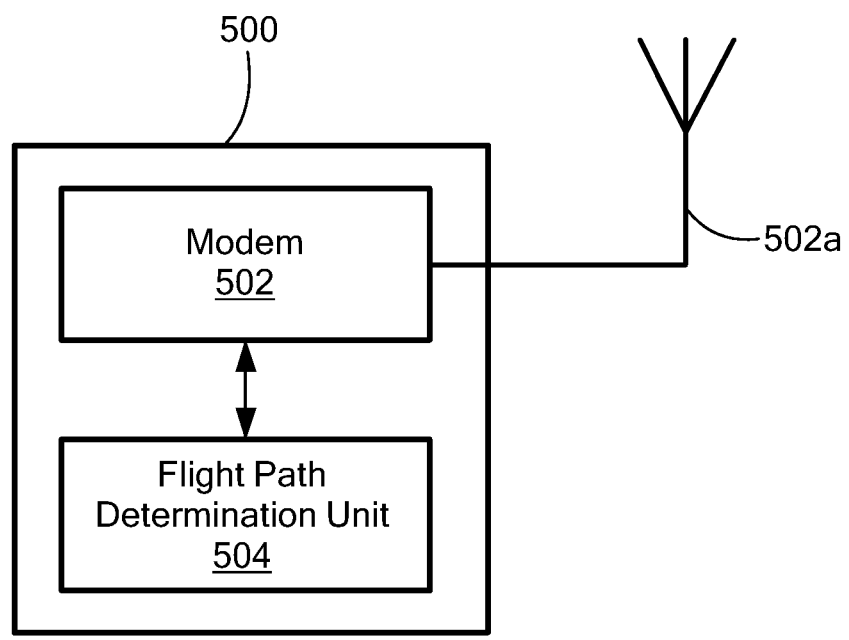
FIG. 5 is a block diagram illustrating a ground station for use with the UAV platform of FIG. 4.

In operation, the illustrative UAV 400 sends telemetry data to a remote processor, such as a ground station 500 shown in FIG. 5. The UAV 400 may send telemetry data continuously, periodically, or on an as-needed basis (e.g., when a next waypoint is needed). In response, the remote processor returns flight path information (e.g., GPS waypoints), which is used (either directly or indirectly) by the flight controller 208 to control the UAV's flight.

Referring to FIG. 5, an illustrative ground station 500 may perform some or all of the remote processing described above in conjunction with FIG. 4. For example, the ground station 500 can include a flight path determination unit 504 to receive telemetry data (e.g., position information and sensor data obtained by the UAV) and determine flight path information that is returned to the UAV. Accordingly, the flight path determination unit 504 may use the same or similar techniques described above in conjunction with the unit 214 of FIG. 2. In a particular embodiment, the flight path determination unit 504 uses two-part flight strategy including randomized flight and a geo-localization process to locate a target at an unknown location. As shown, the ground station 500 may include a modem 502 coupled to an RF antenna 502a and configured to receive the telemetry data from the UAV 400 (FIG. 4) and to transmit flight path information.

The ground station 500 may be provided, for example, as a personal computer (PC), a tablet computer, or other mobile or non-mobile processing device including hand-held devices. In a particular embodiment, the modem 502 comprises a 900 MHz DIGI XBee module. In some embodiments, the ground station 500 further includes a user input device (e.g., a keyboard, mouse, touch screen, etc.) by which an operator can provide override flight instructions to the UAV. In a particular embodiment, the ground station includes a user display to present information about the UAV's flight path. For example, the ground station may display telemetry data to the operator. In some embodiments, the ground station 500 generates a display including a map of the search area overlaid with the UAV's flight path. In a particular embodiment, the ground station 500 is connected to the Internet to query a United States Geological Survey (USGS) server and configured to build maps for an overview of the region of interest.

FIGS. 6, 6A, and 6B are flowcharts corresponding to below contemplated techniques that may be implemented within a UAV (e.g., the UAV 200 of FIG. 2) and/or within a ground station (e.g., the ground station 500 of FIG. 5). Rectangular elements (typified by element 604 in FIG. 6), herein denoted "processing blocks," represent computer software instructions or groups of instructions. Rectangular elements having double vertical bars (typified by element 602 in FIG. 6), herein denoted "sub-processing blocks," represent groups of computer software instructions. Diamond shaped elements (typified by element 624 in FIG. 6A), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 6, an illustrative method 600, begins at block 602, where randomized flight is used to locate at least three points (referred to as "initialization points") suitable for constructing an initial simplex triangle. At block 604, one or more candidate triangles are enumerated having vertices at the initialization points; in some embodiments, all possible such triangles are enumerated. At block 606, one of the candidate triangles having a suitable geometric spread is chosen as the initial simplex triangle. This involves finding three points that are not collinear and/or have geometric spread exceeding a pre-determined threshold, ensuring that the initial triangle for the subsequent simplex minimization process is adequately chosen for recursively homing in on the target. In a certain embodiment, the random flight measurements are sorted by confidence level, then the first M points (e.g., M=50 points) are used to construct the candidate triangles. All possible triangles may be constructed and sorted by geometric spread to choose the triangle having the highest spread. Alternatively, processing may be stopped after any triangle with suitable geometric spread is found.

Having chosen an initial simplex triangle, an iterative simplex minimization process 608 is executed to home in on the target and. In some embodiments, at block 610, the UAV autonomously lands near the target and broadcasts its geographic location (e.g., to the ground station 500 of FIG. 5).

It should be appreciated that the method 600 may be implemented via a finite state machine by dividing or otherwise treating the method as a randomized flight stage (block 602) and a simplex minimization (block 608) stage. The UAV transitions from randomized flight to the simplex minimization stage after at least suitable points are located.

An illustrative randomized flight procedure 602 is shown in FIG. 6A where, beginning at blocks 620 and 622, a random target location is selected by choosing a random direction and a random step size. In some embodiments, if the random location is outside the bounded search area (block 624), the location may be ignored and a new location is random chosen. Otherwise, at block 626, the UAV flies to the random location and, at block 628, obtains a confidence level associated with that location using an onboard sensor. If the confidence level exceeds a pre-determined threshold, the random location may be saved (e.g., in memory) for possible use to construct the initial simplex triangle.

The random flight procedure of blocks 620-628 may be repeated until certain at least three suitable points are found to form the initial simplex triangle. In some embodiments (block 630), random flight is terminated if at least three locations (referred to as "initializing points") have been found having associated confidence levels above the pre-determined threshold. The other requirements is that at least three of initializing points must define a triangle with points that are not collinear and/or have a geometric spread above a pre-determined threshold. This ensures that the initial simplex triangle for the subsequent simplex optimization is adequately chosen for recursively homing in on the target. Although the method 602 can terminate after finding as few as three points, it should be understood that it may be advantageous to identify more than three points. For example, increasing the number of points measured during random flight can increase the likelihood of receiving a real signal as opposed to noise, which is a concern if the system does not have any a priori knowledge of what the minimum RSSI must be.

An illustrative simplex minimization process 608 is shown in FIG. 6B, which begins with an initial simplex triangle. As discussed above, each of the three vertexes of the simplex triangle have an associated confidence level. At block 640, the vertex with the lowest confidence level is reflected through the line defined by the other two vertexes; the corresponding location is referred to here as the "candidate vertex." The line connecting the vertex with the lowest confidence level and the candidate vertex is referred to herein as the "reflection line."

For example, referring back to FIG. 1A, assume that the simplex triangle is defined by points 108*d*, 108*e*, and 108*f*, with point 108*e* having a lowest confidence level (i.e., it is furthest from the target 104). Accordingly, at block 640, the point 108*e* is reflected through the line 112 defined by points 108*d* and 108*f* to determine the candidate vertex 108*g*. A reflection line 110 connects the points 108*e* and 108*g*, as shown.

At block 642, the UAV flies to the candidate vertex (or "takes a step") and, at block 644, the UAV determines (e.g., by computing or measuring) a confidence level at that location using an onboard sensor. At block 646, if the candidate vertex confidence level is greater than the previous highest confidence level (i.e., the highest confidence level of any vertex previously considered in the current simplex loop), the candidate vertex is re-defined (block 648) to be another step of the same size in the same direction and (block 650) the UAV flies to the re-defined candidate location. Otherwise, at block 652, if the candidate vertex confidence level is less than the previous second lowest confidence level (i.e., the second lowest confidence level of any vertex previously considered in the current simplex loop), the candidate vertex is re-defined (block 654) to be half the distance back along line defined by the other two vertexes and (block 650) the UAV flies to the re-defined candidate location. At block 656, a new simplex triangle is defined consisting of the two vertexes having the previous two highest confidence levels and the candidate vertex.

Using FIG. 1A again as an example, the UAV 102 flies to the candidate vertex 608*g* and obtains a confidence level measurement associated with that location. Assuming that the new confidence level is greater than the previous highest confidence level (i.e., higher than the confidence levels associated with points 108*d*-108*f*), the candidate vertex is re-defined to be location 108*h*, which is another size step of the same size in the same direction (i.e., along the reflection line 110). Accordingly, the new simplex triangle is defined by the points 108*d*, 108*f*, and 108*h*. Alternatively, assuming that the new confidence level is less than the previous second lowest confidence level (i.e., the confidence level associated with either waypoint 108*d* or 108*f* in this example), the UAV would backtrack halfway along the reflection line 110 and the candidate vertex would be re-defined accordingly.

The processing of blocks 640-656 can be iterated until the UAV is sufficiently close to the target. In some embodiments, this determination is made (block 658) by comparing the last step size to a pre-determined minimum value (or "epsilon").

Figure 7:
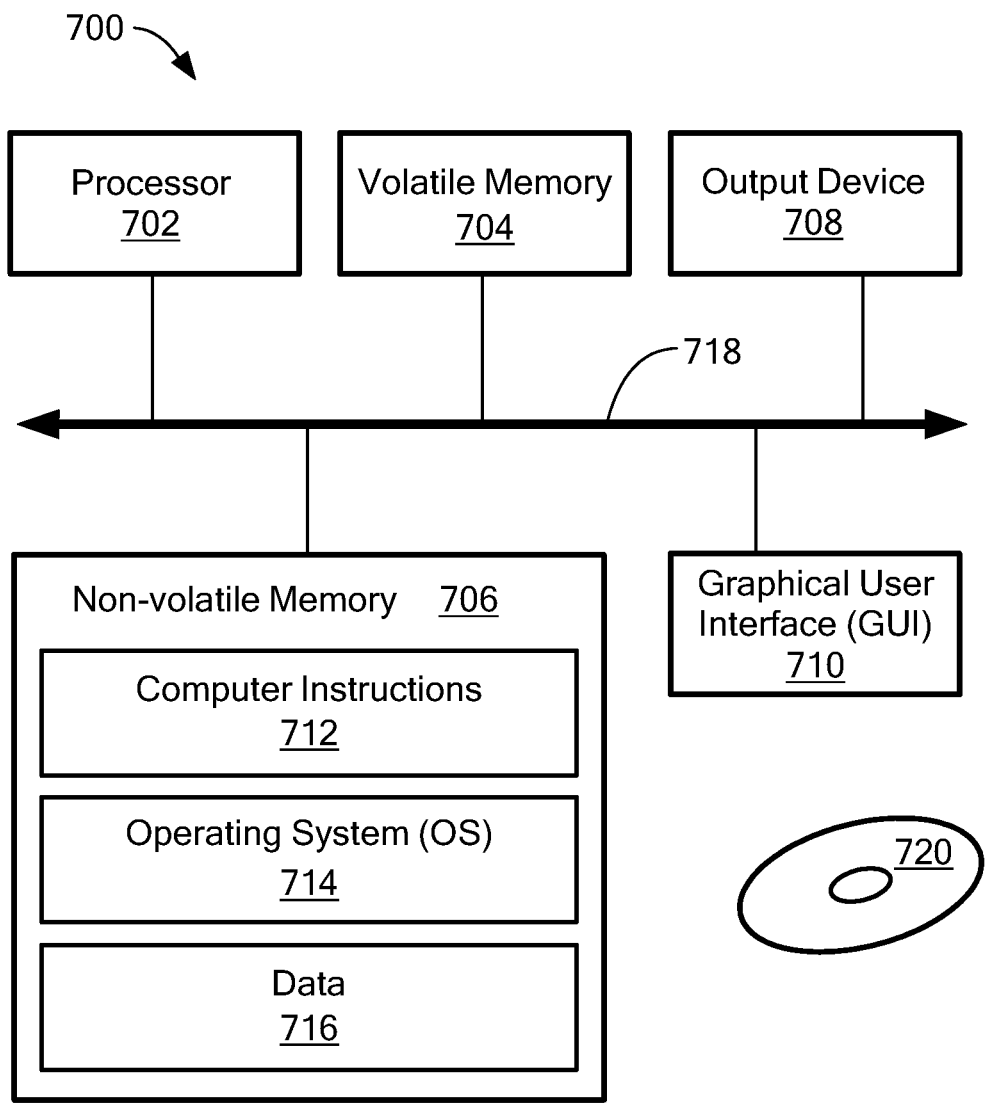
FIG. 7 is a schematic representation of an illustrative computer which may form part of the systems of FIGS. 2, 4, and 5.

FIG. 7 shows an illustrative computer or other processing device 700 that can perform at least part of the processing described herein. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Having described certain embodiments of the concepts, structures, and techniques sought to be protected herein it will now become apparent to those of ordinary skill in the art that other embodiments incorporating these concepts and techniques may be used. Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. Accordingly, it is submitted that that the concepts, structures, and techniques sought to be protected herein should not be limited to the described embodiments but rather should be limited only by the spirit and scope of the appended claims.

What is claimed is:

1. An unmanned aerial vehicle (UAV) having one or more sensors disposed thereon, the UAV for determining an unknown location of a target located within a designated area of interest, but out of range of the one or more sensors, the UAV comprising:
    a position determination unit to generate location data concerning the UAV's position;
    a sensor to obtain sensor data associated with the target;
    a flight path determination unit operatively coupled to receive the location data from the position determination unit and sensor data from at least one of the one or more sensors, and in response to the location data and the sensor data, the flight path determination unit selects a flight path directed by a randomized flight process to search the designated area of interest and a geo-localization flight process to home in on the target, wherein the geo-localization flight process comprises a simplex minimization process, wherein the flight path determination unit transitions from the randomized flight process to the geo-localization flight process after three or more locations are identified having associated confidence levels exceeding a first pre-determined threshold, wherein the three or more locations form an initial simplex triangle having a geometric spread exceeding a second predetermined threshold, wherein the initial simplex triangle is provided as input to the simplex minimization process; and
    a flight controller operatively coupled to the flight path determination unit to fly the UAV along the selected flight path.

2. The UAV of claim 1 wherein the sensor data comprises confidence levels estimating the proximity of the UAV to the target and said flight path determination unit utilizes the confidence levels to select the flight path.

3. The UAV of claim 1 wherein the randomized flight process comprises Lévy flight.

4. The UAV of claim 1 wherein the sensor comprises a received signal strength indicator (RSSI) receiver.

5. The UAV of claim 1 wherein the flight path determination unit bounds the selected flight path to within the designated area of interest.

6. The UAV of claim 1 wherein the sensor is configured to obtain sensor data comprising scalar values.

7. The UAV of claim 1 further comprising one or more rotors, wherein the flight controller is configured to fly the UAV along the selected flight path using the one or more rotors.

8. The UAV of claim 1 wherein the flight path determination unit is configured to calculate the geometric spread of the initial simplex triangle using a difference between a sum of lengths of two shorter sides of the initial simplex triangle and a length of a longest side of the initial simplex triangle.

9. A method for navigating an unmanned aerial vehicle (UAV) to locate a target within a designated area of interest, the method comprising:
    directing the UAV over the designated area of interest using a randomized flight process;
    during the randomized flight process, receiving location data concerning the UAV's position and sensor data associated with the target;
    processing the location data and the sensor data to identify a plurality of locations suitable to initialize a geo-localization flight process, wherein the geo-localization flight process comprises a simplex minimization process, wherein the plurality of locations includes three or more locations having associated confidence levels exceeding a first pre-determined threshold, wherein the three or more locations form an initial simplex triangle having a geometric spread exceeding a second predetermined threshold;
    transitioning from the randomized flight process to the geo-localization flight process including providing the initial simplex triangle as input to the simplex minimization process;
    directing the UAV over the designated area of interest using the geo-localization flight process initialized using the plurality of locations; and
    estimating the target location using a final UAV location.

10. The method of claim 9 wherein using randomized flight process comprises:
    choosing a random step sizes;
    choosing a random directions; and
    directing the UAV to random locations defined by the random step sizes and the random directions.

11. The method of claim 10 wherein choosing the random step sizes comprises choosing random step sizes using a Cauchian or a Gaussian distribution.

12. The method of claim 9 wherein receiving sensor data associated with the target comprises receiving received signal strength indication (RSSI) data associated with a radio frequency (RF) transmitter.

13. The method of claim 9 wherein receiving sensor data associated with the target comprises receiving sensor data associated with the target that is stationary for the duration of the randomized flight process.

14. The method of claim 9 further comprising calculating the geometric spread of the initial simplex triangle using a difference between a sum of lengths of two shorter sides of the initial simplex triangle and a length of a longest side of the initial simplex triangle.

15. A system for locating a target within a designated area of interest, the system comprising:
    an unmanned aerial vehicle (UAV) comprising:
        a position determination unit to generate location data concerning the UAV's position,
        a sensor to obtain sensor data associated with a target, and
        a flight controller to fly the UAV along a selected flight path; and
    a remote processor comprising:

a flight path determination unit operatively coupled to receive the location data from the position determination unit and the sensor data from the sensor, and in response to the location data and the sensor data the flight path determination unit selects the flight path directed by a randomized flight process to search the designated area of interest and a geo-localization flight process to home in on the target, wherein the geo-localization flight process comprises a simplex minimization process, wherein the flight path determination unit transitions from the randomized flight process to the geo-localization flight process after three or more locations are identified having associated confidence levels exceeding a first pre-determined threshold, wherein the three or more locations form an initial simplex triangle having a geometric spread exceeding a second predetermined threshold, wherein the initial simplex triangle is provided as input to the simplex minimization process.

16. The system of claim 15 wherein the randomized flight process comprises Lévy flight.

17. The system of claim 15 wherein the flight path determination unit is configured to calculate the geometric spread of the initial simplex triangle using a difference between a sum of lengths of two shorter sides of the initial simplex triangle and a length of a longest side of the initial simplex triangle.

* * * * *

UNITED STATES PATENT AND TRADEMARK OFFICE
CERTIFICATE OF CORRECTION

PATENT NO. : 9,696,430 B2
APPLICATION NO. : 14/468905
DATED : July 4, 2017
INVENTOR(S) : Michael J. Park et al.

Page 1 of 1

It is certified that error appears in the above-identified patent and that said Letters Patent is hereby corrected as shown below:

In the Specification

Column 2, Line 57 delete "a random step sizes, choosing a random directions" and replace with --a random step size, choosing a random direction--.
Column 3, Line 14 delete "within a within a designated sizes" and replace with --within a designated--.
Column 5, Line 10 delete "sizes that more often" and replace with --sizes that are often--.
Column 5, Line 14 delete "any other any suitable" and replace with --any other suitable--.
Column 8, Line 28 delete "estimate or me" and replace with --estimate of the--.
Column 8, Line 51 delete "a RF emitter" and replace with --an RF emitter--.
Column 10, Lines 48-49 delete "home in on the target and." and replace with --home in on the target.--.
Column 10, Line 64 delete "is random chosen" and replace with --is randomly chosen--.
Column 11, Lines 9-10 delete "at least three of initializing points" and replace with --at least three initializing points--.
Column 11, Line 62 delete "608g" and replace with --108g--.

In the Claims

Column 14, Line 38 Claim 10 delete "a random step sizes" and replace with --a random step size--.
Column 14, Line 39 Claim 10 delete "a random directions" and replace with --a random direction--.

Signed and Sealed this
Seventh Day of August, 2018

Andrei Iancu
*Director of the United States Patent and Trademark Office*